United States Patent
Kusaba et al.

(10) Patent No.: US 10,457,424 B2
(45) Date of Patent: Oct. 29, 2019

(54) FLEXIBLE THERMAL-CONTROL MATERIAL, AND PRODUCTION METHOD THEREFOR

(71) Applicant: MITSUBISHI HEAVY INDUSTRIES, LTD., Tokyo (JP)

(72) Inventors: Naoki Kusaba, Tokyo (JP); Hidetaka Kafuku, Tokyo (JP); Kenji Najima, Hyogo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 826 days.

(21) Appl. No.: 14/905,392

(22) PCT Filed: Aug. 26, 2014

(86) PCT No.: PCT/JP2014/072241
§ 371 (c)(1),
(2) Date: Jan. 15, 2016

(87) PCT Pub. No.: WO2015/029975
PCT Pub. Date: Mar. 5, 2015

(65) Prior Publication Data
US 2016/0152353 A1    Jun. 2, 2016

(30) Foreign Application Priority Data
Aug. 28, 2013  (JP) ................. 2013-177363

(51) Int. Cl.
*B64G 1/40* (2006.01)
*B64G 1/58* (2006.01)
*B64G 1/50* (2006.01)

(52) U.S. Cl.
CPC ............ *B64G 1/402* (2013.01); *B64G 1/401* (2013.01); *B64G 1/50* (2013.01); *B64G 1/58* (2013.01)

(58) Field of Classification Search
CPC ........................................................ B64G 1/50
See application file for complete search history.

(56) References Cited

U.S. PATENT DOCUMENTS 4,008,348 A    2/1977  Slemp
4,237,193 A *  12/1980 Jackson ............... C23C 28/023
                                                         148/404

(Continued)

FOREIGN PATENT DOCUMENTS

JP   61-64440   4/1986
JP   7-26718    3/1995

(Continued)

OTHER PUBLICATIONS

"Cross Linking of Teflon 100 FEP Fluorocarbon Resin by Radiaiton," Bowers et al., Industrial & Engineering Chemistry Product Research and Development, 1962, 1 (2), pp. 89-92 (Year: 1962).*

(Continued)

*Primary Examiner* — Ian A Rummel
(74) *Attorney, Agent, or Firm* — Wenderoth, Lind & Ponack, L.L.P.

(57) ABSTRACT

This flexible thermal-control material (10A) is obtained by stacking: a reflective layer (12) which reflects sunlight; and an infrared-ray emission layer (13) which emits infrared rays. The infrared-ray emission layer (13) is configured from a radiation-crosslinked fluororesin material. Accordingly, a flexible thermal-control material is achieved which satisfies all of a plurality of conditions related to solar absorption ($\alpha$), total hemispheric infrared ray emissivity ($\varepsilon$), radiation resistance, and atomic oxygen resistance.

11 Claims, 10 Drawing Sheets

(56) References Cited

U.S. PATENT DOCUMENTS

| | | | | |
|---|---|---|---|---|
| 5,589,016 A | * | 12/1996 | Hoopingarner | B29C 59/04 |
| | | | | 156/87 |
| 2005/0001100 A1 | * | 1/2005 | Hsi-Wu | B29C 44/1228 |
| | | | | 244/172.2 |

FOREIGN PATENT DOCUMENTS

| | | | | |
|---|---|---|---|---|
| JP | 2676208 | | 11/1997 | |
| JP | 2846414 | | 1/1999 | |
| JP | 11-49867 | | 2/1999 | |
| JP | 11-291999 | | 10/1999 | |
| JP | 2007-253399 | | 10/2007 | |
| WO | WO-02097829 A1 | * | 12/2002 | C08L 79/08 |
| WO | 2010/119974 | | 10/2010 | |

OTHER PUBLICATIONS

International Search Report dated Nov. 25, 2014 in International (PCT) Application No. PCT/JP2014/072241.
English Translation of the Written Opinion of the International Searching Authority dated Nov. 25, 2014 in corresponding International (PCT) Application No. PCT/JP2014/072241.

* cited by examiner

FLEXIBLE THERMAL-CONTROL MATERIAL, AND PRODUCTION METHOD THEREFOR

TECHNICAL FIELD

The present invention relates to a flexible thermal-control material and a production method therefor.

BACKGROUND ART

In order to prevent an increase in temperature of an airframe due to incidence of solar light, a surface of an artificial satellite or a rocket used in space is coated with a thermal-control material having a function of reflecting the solar light and radiating thermal energy of the solar light to space.

A flexible thermal-control material, a so-called flexible optical solar reflector (OSR), having flexibility which is easily processed according to a surface shape of the airframe or a structure to be coated, is paid attention as the thermal-control material.

PTL 1 discloses a flexible thermal-control material including a metal layer on a polyimide film. In PTL 1, the surface of the polyimide film is subjected to roughening treatment, and accordingly secondary reflection of solar light is prevented and reflectivity and diffuseness are improved.

CITATION LIST

Patent Literature

[PTL 1] Japanese Unexamined Patent Application Publication No. 2007-253399

SUMMARY OF INVENTION

Technical Problem

According to the findings of the inventors, in a flexible thermal-control material, it is required that all conditions of a low solar absorptance coefficient (a), a high total semi-sphere infrared emissivity (s), high tolerance to radiation, and high tolerance to atomic oxygen in space are satisfied, in order to realize long-term use in space. However, the flexible thermal-control material disclosed in PTL 1 does not satisfy all conditions described above.

Accordingly, it is desired to realize a flexible thermal-control material which satisfies all conditions described above.

The present invention has been made to address the aforementioned problems and provides a flexible thermal-control material which satisfies all of a solar absorptance coefficient ($\alpha$), a total semi-sphere infrared emissivity ($\varepsilon$), radiation resistance, and high tolerance to atomic oxygen in space, and a production method therefor.

Solution to Problem

The invention provides a flexible thermal-control material which is formed by laminating: a reflection layer which reflects solar light; and an infrared radiation layer which radiates infrared light, in which the infrared radiation layer is configured with a radiation crosslinked fluorine resin material.

In the flexible thermal-control material, it is preferable that a support layer is further laminated on a surface of the reflection layer on the side opposite to the surface where the infrared radiation layer is laminated.

In the flexible thermal-control material, it is preferable that a protection layer is further laminated on a surface of the infrared radiation layer on the side opposite to the surface where the reflection layer is laminated.

In the flexible thermal-control material, it is preferable that a conductive layer is further laminated on the protection layer.

In the flexible thermal-control material, it is preferable that an antioxidant layer is further laminated on a surface of the reflection layer on the side opposite to the surface where the infrared radiation layer is laminated.

In the flexible thermal-control material, it is preferable that the antioxidant layer is provided between the reflection layer and the support layer.

In the flexible thermal-control material, it is preferable that the flexible thermal-control material is fixed to a surface of an adherend by a bonding layer.

In the flexible thermal-control material, it is preferable that the flexible thermal-control material is fixed to a surface of an adherend by a fastening member.

In the flexible thermal-control material, it is preferable that the adherend is a propellant tank of a rocket or an artificial satellite used in space.

In the flexible thermal-control material, it is preferable that the propellant tank is a liquid hydrogen tank.

In the flexible thermal-control material, it is preferable that a surface of the adherend is any one of a polyisocyanurate foam (PIF) heat insulating layer and a polyimide foam heat insulating layer or a heat insulating layer of a laminated body thereof.

In the flexible thermal-control material, it is preferable that the surface of the adherend includes a degassing groove in any one of a polyisocyanurate foam (PIF) heat insulating layer and a polyimide foam heat insulating layer or a heat insulating layer of a laminated body thereof.

The invention provides a production method for a flexible thermal-control material which is formed by laminating at least a reflection layer and an infrared radiation layer and in which the infrared radiation layer is configured with a radiation crosslinked fluorine resin, the method including: a radiation crosslinking step of performing crosslinking of a fluorine resin by emitting radioactive rays and forming the infrared radiation layer; and a step of forming the reflection layer by laminating a metal film on the surface of the infrared radiation layer obtained in the radiation crosslinking step.

In the production method, it is preferable that the production method further includes an antioxidant layer formation step of further laminating an antioxidant layer on the surface of the reflection layer.

The invention provides a production method for a flexible thermal-control material which is formed by laminating a support layer, a reflection layer, and an infrared radiation layer and in which the infrared radiation layer is configured with a radiation crosslinked fluorine resin, the method including: a radiation crosslinking step of performing crosslinking of a fluorine resin by emitting radioactive rays and forming the infrared radiation layer; and a laminated body formation step of forming the reflection layer by laminating a metal film on the support layer and forming a laminated body by laminating a fluorine resin which is not yet subjected to radiation crosslinking on the reflection layer, before the radiation crosslinking step.

In the production method, it is preferable that the support layer is formed with a polyimide material or a polyester material.

In the production method, it is preferable that the metal film is formed by vapor deposition.

Advantageous Effects of Invention

The invention exhibits an effect of providing a flexible thermal-control material which satisfies all of a solar absorptance coefficient ($\alpha$), a total semi-sphere infrared emissivity ($\varepsilon$), radiation resistance, and high tolerance to atomic oxygen in space, and a production method therefor.

DESCRIPTION OF EMBODIMENTS

Hereinafter, the invention will be described with reference to the accompanied drawings. The invention is not limited to the following embodiments or examples. In addition, constituent elements of the following embodiments or examples include constituent elements which can be and are easily replaced by a person skilled in the art, or the same constituent elements.

Example 1

Figure 1:
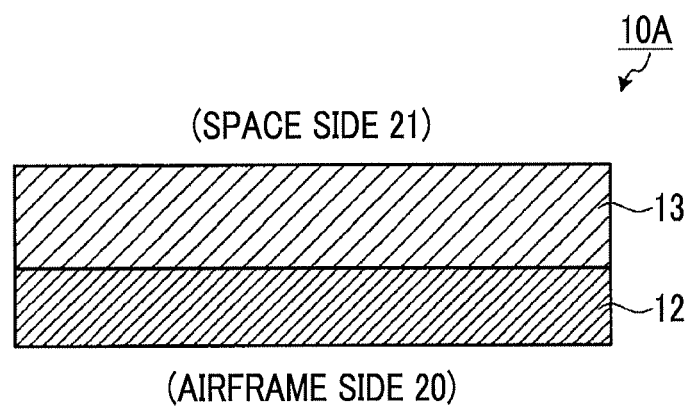
FIG. 1 is a schematic sectional view showing a configuration example of a flexible thermal-control material according to Example 1.

FIG. 1 is a schematic sectional view showing a configuration example of a flexible thermal-control material according to Example 1. As shown in FIG. 1, a flexible thermal-control material 10A according to the example includes a reflection layer 12 and an infrared radiation layer 13. In the example of FIG. 1, the reflection layer 12 is provided on an adherend side (lower side of the drawing) and the infrared radiation layer 13 is provided on the outer side (upper side of the drawing) of the reflection layer 12. That is, in the example of the drawing, the reflection layer 12 is provided on an airframe side 20 which is the adherend and the infrared radiation layer 13 is provided as a surface of a space side 21. That is, in this example, the infrared radiation layer 13 is set as a layer exposed to space.

<Reflection Layer>

The reflection layer 12 is preferably a high-reflectivity material layer. Accordingly, it is possible to reduce heat input to the airframe, by reflecting solar light. Herein, the high-reflectivity material layer is a layer configured with a material which is generally called high-reflectivity metal. As specific examples of such high-reflectivity metal, silver (Ag), aluminum (Al), and gold (Au) can be used, for example, but the specific examples are not limited thereto. In addition, as the high-reflectivity metal, an alloy or various composite materials can be used, in addition to the simple substance of metal elements.

<Infrared Radiation Layer>

The infrared radiation layer 13 is a layer having a function of radiating heat to space without absorbing solar light which is reflected by the reflection layer 12. Since space is in a vacuum state without oxygen, heat transfer due to radiation which does not require a heat transfer medium, is dominantly performed. It is important to efficiently radiate heat of the airframe to space.

The infrared radiation layer 13 is a layer configured with a radiation crosslinked fluorine resin. As the fluorine resin, a simple substance or a mixture of fluorine resins such as a tetrafluoroethylene propylenehexafluoride copolymer (FEP), a tetrafluoroethylene.perfluoroalkylvinyl ether copolymer (PFA), and polytetrafluoroethylene (PTEE) can be used as an original material. In addition, ionizing radioactive rays such as a $\gamma$ ray, an X ray, or an electron ray is preferably used as a radial ray. The original materials such as FEP or PFA are irradiated with ionizing radioactive rays having dose of several tens KGy to 200 KGy in a temperature range which is equal to or higher than a crystalline melting point thereof, that is, 20° C. higher than the crystalline melting point, and in an inert gas atmosphere of nitrogen or argon, and accordingly, it is possible to obtain a radiation crosslinked fluorine resin having improved transparency and improved radiation resistance or heat resistance and mechanical properties.

By using the radiation crosslinked fluorine resin as the infrared radiation layer 13, it is possible to ensure sufficient transparency for solar light to be incident to the reflection layer 12 and to ensure radioactive properties for radiating heat energy of solar light to space. In addition, the radiation crosslinked fluorine resin has excellent radiation resistance and resistance to atomic oxygen, and accordingly, it is possible to realize a flexible thermal-control material which hardly causes performance degradation due to the space environment, by using the radiation crosslinked fluorine resin as the infrared radiation layer 13.

A thickness of the infrared radiation layer 13 is preferably from 50 μm to 300 μm. In this range, excellent balance between a solar absorptance coefficient (α) and a total semi-sphere infrared emissivity (ε) is obtained.

According to the configuration described above, it is possible to realize a flexible thermal-control material having excellent balance in which the solar absorptance coefficient (α) is equal to or less than 0.2 and the total semi-sphere infrared emissivity (ε) is equal to or greater than 0.8. By using a radiation crosslinked fluorine resin having excellent radiation resistance and resistance to atomic oxygen as the infrared radiation layer, it is possible to improve radiation resistance and resistance to atomic oxygen of the entire thermal-control material (thermal-control film) and to provide a flexible thermal-control material which hardly causes performance degradation in space. Although the control effect of an increase in temperature of the airframe decreases, it is also possible to set the thickness of the infrared radiation layer 13 to be smaller than 50 μm, if it is in an acceptable range in thermal design.

According to the configuration described above, it is possible to provide a flexible thermal-control material which is excellently adhered to various structures which is an adherend. In addition, by setting a roll molded body by winding the sheet-like flexible thermal-control material around a core, it is possible to perform the application to an adherend having a cylindrical outer shape.

Example 2

Figure 2:
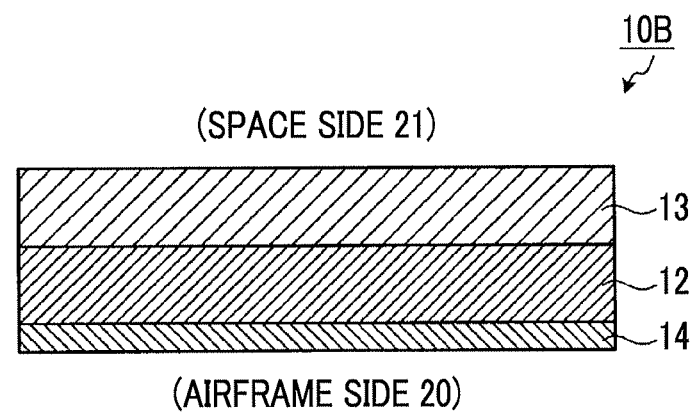
FIG. 2 is a schematic sectional view showing a configuration example of a flexible thermal-control material according to Example 2.

FIG. 2 is a schematic sectional view showing a configuration example of a flexible thermal-control material according to Example 2. As shown in FIG. 2, a flexible thermal-control material 10B is formed by further laminating an antioxidant layer 14 on a surface of the reflection layer 12 on the side opposite to the surface where the infrared radiation layer 13 is laminated, in the flexible thermal-control material 10A according to Example 1. That is, the antioxidant layer 14 is further provided on the lower side of the reflection layer 12 (lower side of the drawing), that is, the structure (airframe side 20 which is an adherend) side coated with the flexible thermal-control material 10B. In the example, the same reference numerals are used for the same constituent elements as those in Example 1 and the description thereof will be omitted.

The antioxidant layer 14, for example, can be configured with a nickel-base superalloy (inconel or the like), chromium, nickel, and gold (vapor deposition on an aluminum surface). Among these, a nickel-base superalloy is particularly preferable, from viewpoints of anti-oxidation properties and corrosion resistance.

According to the configuration described above, it is possible to further improve an anti-oxidation effect by atomic oxygen in space. In addition to the configuration of the embodiment, in a case of providing a support layer, the antioxidant layer is preferably provided between the reflection layer and the support layer.

Example 3

Figure 3:
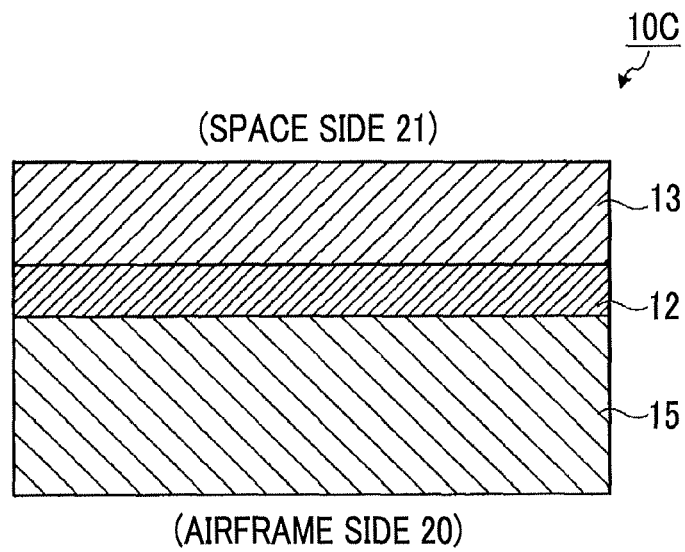
FIG. 3 is a schematic sectional view showing a configuration example of a flexible thermal-control material according to Example 3.

FIG. 3 is a schematic sectional view showing a configuration example of a flexible thermal-control material according to Example 3. As shown in FIG. 3, a flexible thermal-control material 10C is formed by further laminating a support layer 15 on a surface on the side opposite to the surface where the infrared radiation layer 13 is laminated, in the flexible thermal-control material 10A according to Example 1. That is, the support layer 15 is further provided on the lower side of the reflection layer 12 (lower side of the drawing), that is, the structure (airframe side 20 which is an adherend) side coated with the flexible thermal-control material 100.

As will be described later, there are two methods of producing the flexible thermal-control material containing the radiation crosslinked fluorine resin as the infrared radiation layer 13. That is, a first method of forming a radiation crosslinked fluorine resin and laminating the reflection layer 12 and the antioxidant layer 14 thereon and a second method of forming a necessary layer structure and performing radiation crosslinking of the fluorine resin are used. In a case of the previous first method, mechanical properties of the fluorine resin are improved by the radiation crosslinking, and accordingly it is easy to provide a metal layer on the fluorine resin. However, in a case of the latter second method, it is difficult to provide a metal layer on the uncrosslinked fluorine resin, and accordingly, a metal layer is formed on the support layer 15 and the fluorine resin is laminated thereon by heat sealing and then the fluorine resin is subjected to radiation crosslinking in the conditions described above, and therefore, it is suitable for producing the flexible thermal-control material.

As the support layer 15, it is preferable to use a polyimide material such as a polyimide resin from viewpoints of strength and heat resistance. Alternatively, a polyester material such as polyethylene-telephthalate (PET), which is a material having a function and an effect of preventing generation of cracks or tears on the reflection layer and the infrared radiation layer may be used.

According to the configuration described above, it is possible to apply suitable hardness or strength to the flexible thermal-control material so as to be applied. Accordingly, it is possible to prevent generation of cracks on the reflection layer 12, when attaching or bonding the flexible thermal-control material to a structure (airframe) such as a rocket or an artificial satellite.

Example 4

Figure 4:
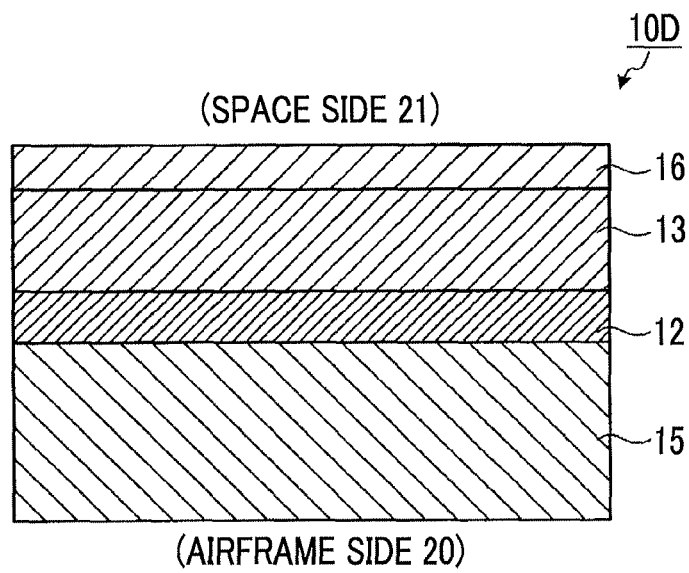
FIG. 4 is a schematic sectional view showing a configuration example of a flexible thermal-control material according to Example 4.

FIG. 4 is a schematic sectional view showing a configuration example of a flexible thermal-control material according to Example 4. As shown in FIG. 4, a flexible thermal-control material 10D is formed by further laminating a protection layer 16 on a surface of the infrared radiation layer 13 on the side opposite to the surface where the reflection layer 12 is laminated, in the flexible thermal-control material 10C according to Example 3. That is, the protection layer 16 is further provided on the upper side of the infrared radiation layer 13 (upper side of the drawing), that is, on the space side 21.

The protection layer 16 preferably has a solar absorptance coefficient (a) in an acceptable range and a transparent protection layer is further preferable.

The protection layer 16 provides a function and an effect of preventing surface contamination of the flexible thermal-control material. For example, when applying the flexible thermal-control material to a rocket, a propellant tank of the rocket becomes an adherend, and the outer surface of the propellant tank of the rocket is coated with the flexible thermal-control material. In this case, the protection layer 16 is provided on the surface of the infrared radiation layer 13 on the space side 21 so as to provide a function and an effect of preventing surface contamination or damage to the flexible thermal-control material 10D from the application of the material to the rocket fire.

As the protection layer 16, it is preferable to configure silsesquioxane having higher resistance to atomic oxygen among the silicone materials. It is possible to obtain higher resistance to atomic oxygen, by coating the surface of the flexible thermal-control material with silsesquioxane.

In addition, as the protection layer 16, a hard coat material of a fluorine material can be used, for example, in order to prevent damage to the surface.

Further, as the protection layer 16, a resin material in which nanoparticles such as hollow silica are dispersed may be used, for example. As a result, a gas barrier layer or a heat-resistant barrier layer for preventing oxidative degradation due to aerodynamic heating at the time of the rocket fire is formed, and accordingly, it is possible to improve gas barrier properties or insulating performance.

Example 5

Figure 5:
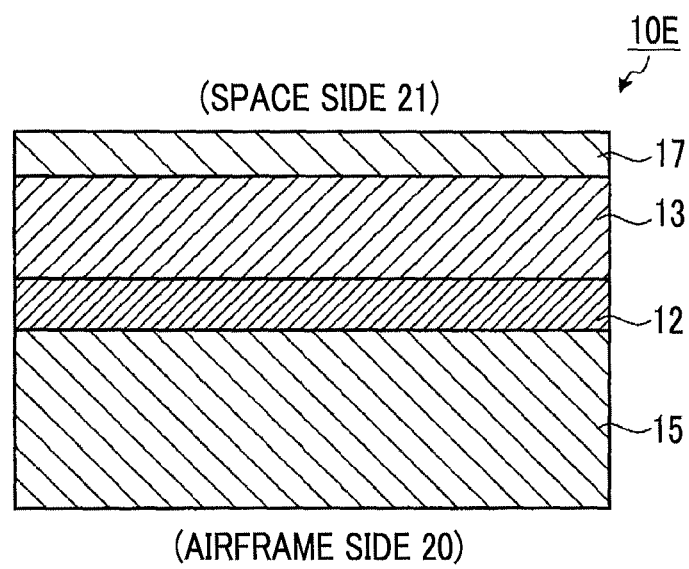
FIG. 5 is a schematic sectional view showing a configuration example of a flexible thermal-control material according to Example 5.

FIG. 5 is a schematic sectional view showing a configuration example of a flexible thermal-control material according to Example 5. As shown in FIG. 5, a flexible thermal-control material 10E is formed by further laminating a conductive layer 17 on the infrared radiation layer 13 in the flexible thermal-control material 10C according to Example 3. That is, the conductive layer 17 is further provided on the surface of the infrared radiation layer 13, that is, the outermost surface on the space side 21.

The conductive layer 17 has a function and an effect of preventing damage to the flexible thermal-control material 10E due to an electric discharge. In addition, the conductive layer 17 is preferably a transparent conductive layer having transparency so as to allow solar light to be incident to the reflection layer.

As the conductive layer 17, a metal compound material having conductivity such as indium tin oxide (ITO), antimony tin oxide (ATO), or $TiO_2$ (titanium dioxide) doped with Nb, or carbon-based material such as carbon nanotube can be used.

According to the configuration described above, it is possible to provide a flexible thermal-control material having reduced risk of damage due to an electric discharge.

Example 6

Figure 6:
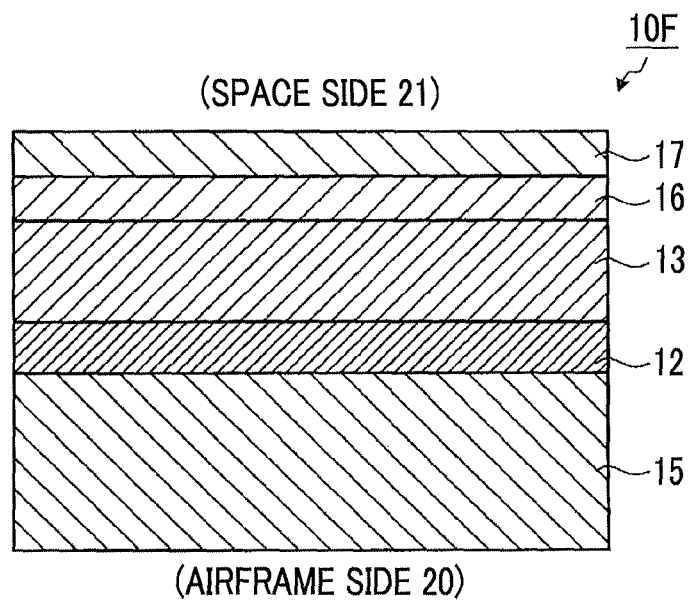
FIG. 6 is a schematic sectional view showing a configuration example of a flexible thermal-control material according to Example 6.

FIG. 6 is a schematic sectional view showing a configuration example of a flexible thermal-control material according to Example 6. As shown in FIG. 6, a flexible thermal-control material 10F is formed by further laminating the conductive layer 17 on the protection layer 16 in the flexible thermal-control material 10D according to Example 5. That is, the conductive layer 17 is further provided on the surface of the protection layer 16, that is, the outermost surface on the space side 21.

According to the configuration described above, it is possible to provide a flexible thermal-control material exhibiting a protection effect and having reduced risk of damage due to an electric discharge, by further providing the conductive layer 17 on the surface of the protection layer 16.

Example 7

Application Example (1) of Flexible Thermal-Control Material

Figure 7:
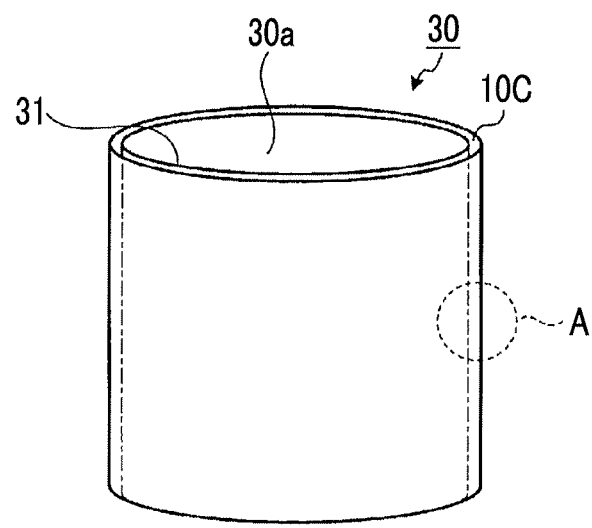
FIG. 7 is a schematic view showing an example of applying the flexible thermal-control material on an adherend.
Figure 8:
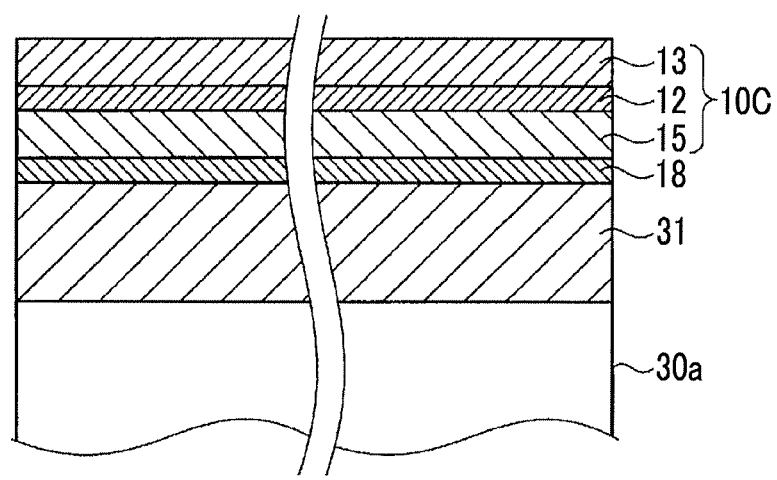
FIG. 8 is an enlarged schematic sectional view showing an enlarged A part of FIG. 7.
Figure 9:
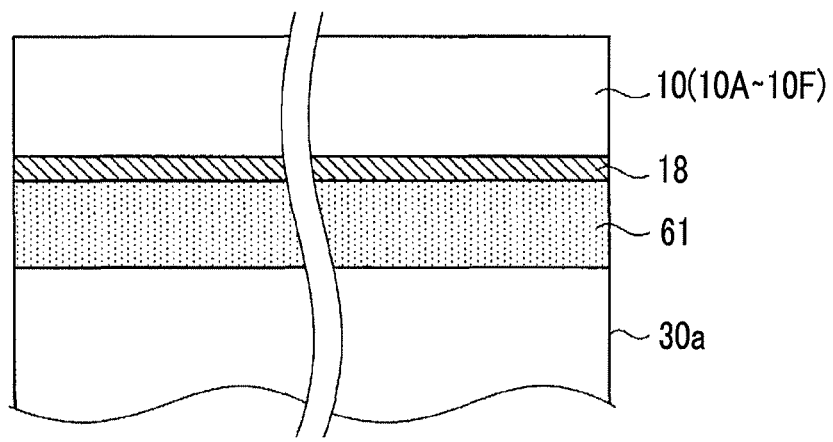
FIG. 9 is an enlarged schematic sectional view showing an enlarged A part of FIG. 7.
Figure 10:
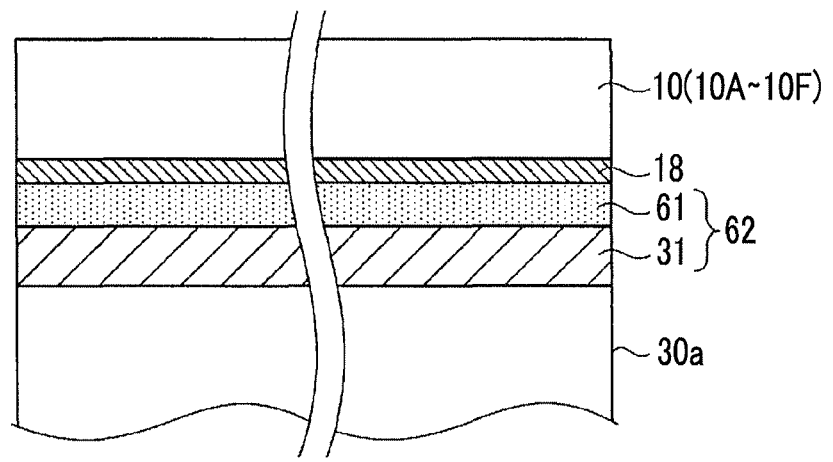
FIG. 10 is an enlarged schematic sectional view showing an enlarged A part of FIG. 7.

FIG. 7 is a schematic view showing an example of applying the flexible thermal-control material on an adherend. In the example of the drawing, an adherend is a propellant tank (for example, liquid hydrogen tank) of a rocket. FIGS. 8 to 10 are enlarged schematic sectional views showing an enlarged A part of FIG. 7.

In the example of the laminated body shown in FIG. 7, a surface of a tank main body 30a of a propellant tank 30 such as a liquid hydrogen tank is coated with the flexible thermal-control material 100 according to Example 3. Herein, a polyisocyanurate foam (PIF) heat insulating layer (hereinafter, referred to as a "PIF heat insulating layer") 31 is formed on the surface of the propellant tank and the flexible thermal-control material 100 is applied to the surface thereof.

FIG. 8 is a diagram specifically illustrating a relationship between the surface of the propellant tank of FIG. 7, that is, the PIF heat insulating layer 31, and the flexible thermal-control material 100. As shown in FIG. 8, the flexible thermal-control material 100 in which the reflection layer 12 is laminated on the support layer 15 and the infrared radiation layer 13 is further laminated on the surface thereof, is adhered onto the PIF heat insulating layer 31 through a bonding layer 18 and covers the tank main body 30a.

The bonding layer 18 is a layer configured with a pressure sensitive adhesive or an adhesive, for example. As a pressure sensitive adhesive or an adhesive, a material which hardly causes generation of gas in a vacuum environment as in space is preferable.

In the embodiment, the flexible thermal-control material 10C is adhered to the PIF heat insulating layer on the surface of the liquid hydrogen tank by the bonding layer 18, but the flexible thermal-control material 10C can also be adhered to the surface of the liquid hydrogen tank by a fastening member. As the fastening member, a fastener for fastening and fixing a component to another component can be used, for example. A rivet can be used, for example, as the fastener.

FIG. 9 is a diagram in which the flexible thermal-control material 10 (10A to 10F) is provided by the bonding layer 18 using a polyimide foam heat insulating layer 61, instead of the PIF heat insulating layer 31 of FIG. 8. The polyimide foam heat insulating layer 61 is a foam in which air bubbles have an open-cell structure and exhibits an effect of vacuum insulation. A thickness of the polyimide foam heat insulating layer 61 is, for example, preferably approximately from 10 mm to 50 mm.

FIG. 10 is a diagram in which the flexible thermal-control material 10 (10A to 10F) is provided on a heat insulating layer 62 having a laminated body structure of two layers which are the PIF heat insulating layer 31 of FIG. 8 and the polyimide foam heat insulating layer 61.

The polyimide foam heat insulating layer 61 is a foam in which air bubbles have an open-cell structure and exhibits an effect of vacuum insulation. A thickness of the heat insulating layer 62 of two layers which are the PIF heat insulating layer 31 and the polyimide foam heat insulating layer 61 is, for example, preferably approximately from 10 mm to 50 mm.

In the example, the PIF heat insulating layer 31 is provided on the tank main body 30a side, but the polyimide foam heat insulating layer 61 side may be set as the tank main body 30a side and the PIF heat insulating layer 31 may be provided on the upper layer thereof.

Example 8

Application Example (2) of Flexible Thermal-Control Material

Figure 11:
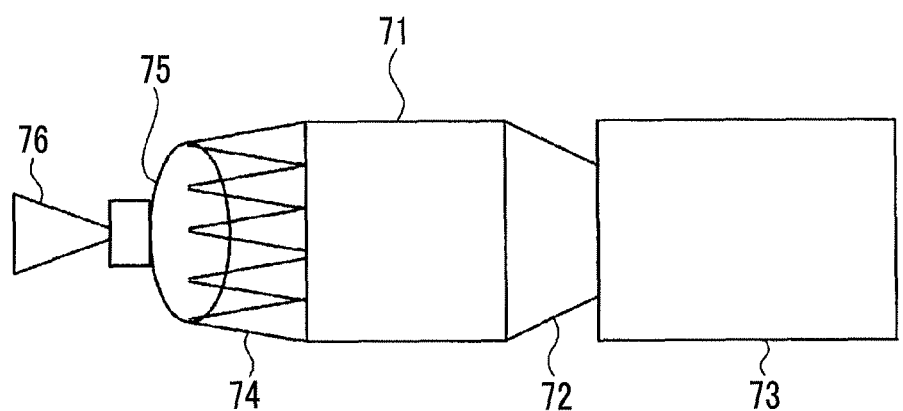
FIG. 11 is a diagram showing an example of a schematic view of a rocket.

FIG. 11 is a diagram showing an example of a schematic view of a rocket. As shown in FIG. 11, a satellite 73 is provided on a head portion side of a liquid hydrogen tank 71 which is a propellant tank through a pedestal 72. A liquid oxygen tank 75 is provided on a rear side of the liquid hydrogen tank 71 through a rod 74 and performs a supply operation to an engine 76 side.

Figure 12A:
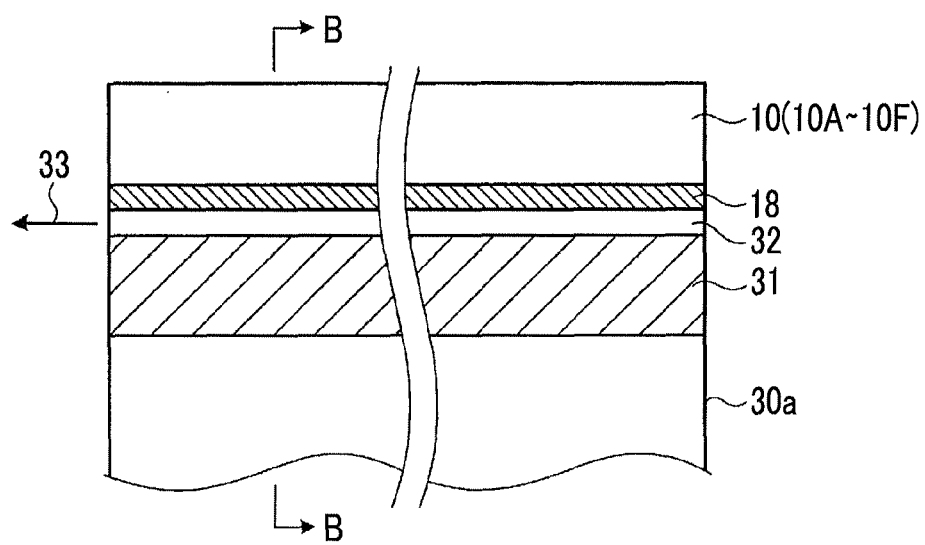
FIG. 12A is a sectional view in a longitudinal direction of a flexible thermal-control material which is applied on a liquid hydrogen tank.
Figure 12B:
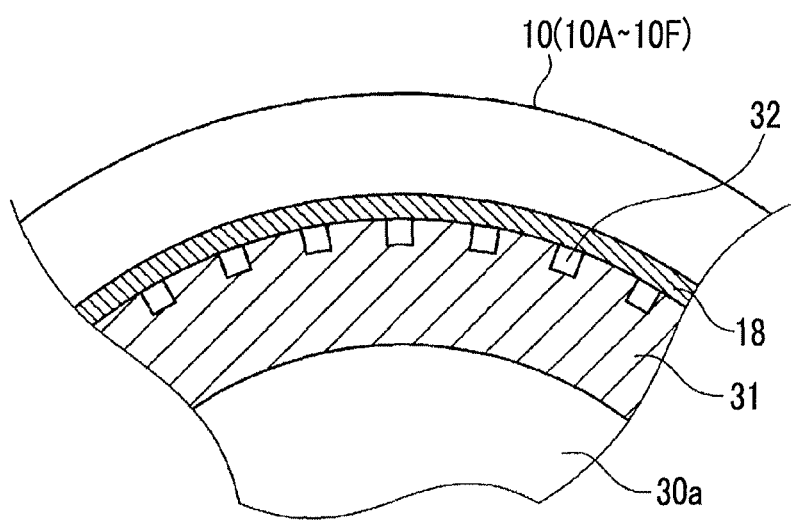
FIG. 12B is a B-B line sectional view of FIG. 12A.

FIG. 12A is a sectional view in a longitudinal direction of a flexible thermal-control material which is applied on a liquid hydrogen tank and FIG. 12B is a B-B line sectional view of FIG. 12A.

In the example, the PIF heat insulating layer 31 is formed on the surface of the liquid hydrogen tank 71 and the flexible thermal-control material 10 (10A to 10F) according to Examples described above is coated on the surface of the PIF heat insulating layer 31. The flexible thermal-control material 10 (10A to 10F) is the same material as in examples 1 to 6 and the description thereof will be omitted.

In the example, a degassing groove 32 is formed along an axial direction of the PIF heat insulating layer 31 and perform degassing of exhaust gas (for example, low molecular component) 33 generated in the PIF heat insulating layer 31.

Accordingly, negative effects such as vapor deposition due to exhaust gas 33 on the flexible thermal-control material 10 (10A to 10F) formed on the surface of the PIF heat insulating layer 31 or the satellite 73 are prevented and the satellite 73 is protected.

Figure 13:
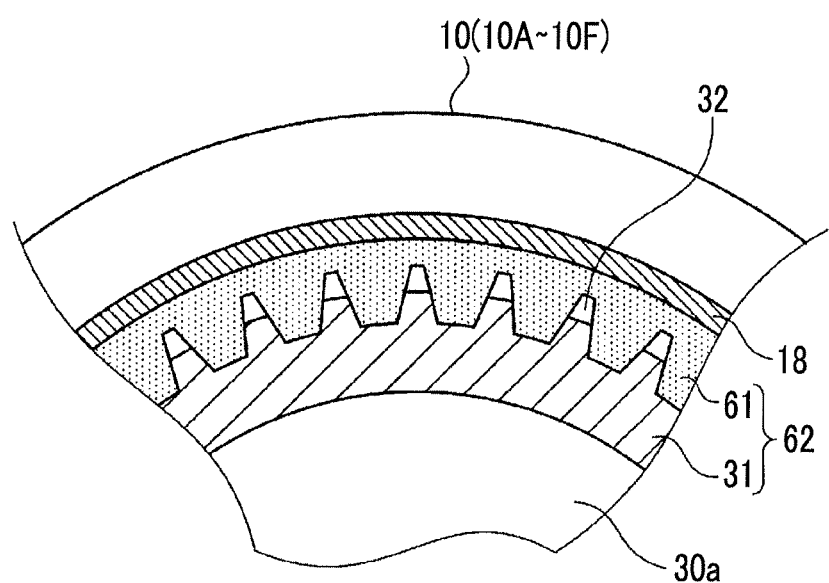
FIG. 13 is a sectional view of another flexible thermal-control material of the example which is applied on a liquid hydrogen tank.

FIG. 13 is a sectional view of another flexible thermal-control material of the example which is applied on a liquid hydrogen tank.

In the example, the heat insulating layer 62 having a two-layered structure of the PIF heat insulating layer and the polyimide foam heat insulating layer 61 is provided on the surface of the tank main body 30a of the liquid hydrogen tank 71 and the flexible thermal-control material 10 (10A to 10F) according to Examples described above is coated on the surface of the heat insulating layer 62 having a two-layered structure.

In the example, the degassing groove 32 is continuously formed along an axial direction of in a boundary between the PIF heat insulating layer 31 and the polyimide foam heat insulating layer 61 and performs degassing of exhaust gas (for example, low molecular component) 33 generated in the heat insulating layer 62. The degassing groove 32 is formed by setting a boundary surface between the PIF heat insulating layer 31 and the polyimide foam heat insulating layer 61 as an approximate gear wheel structure, but the invention is not limited thereto.

As described above, it is possible to suitably realize heat insulation in space which was insufficiently realized with only the PIF heat insulating layer, by coating the outer surface of the propellant tank of the rocket with the flexible thermal-control material according to the invention. In the related art, in a structure used in space such as a rocket or an artificial satellite, heat input from the outside is prevented by the PIF heat insulating layer and evaporation of liquid hydrogen which is propellant is prevented, but in space in a vacuum state without oxygen, heat input due to radiation is dominantly performed and sufficient heat insulating performance cannot be obtained with only the PIF heat insulating layer. It is possible to prevent problems regarding heat input due to radiation in space to improve heat insulating performance, by further coating the PIF surface with the flexible thermal-control material according to the invention.

Example 9

Production Example 1 of Flexible Thermal-Control Material

Figure 14:
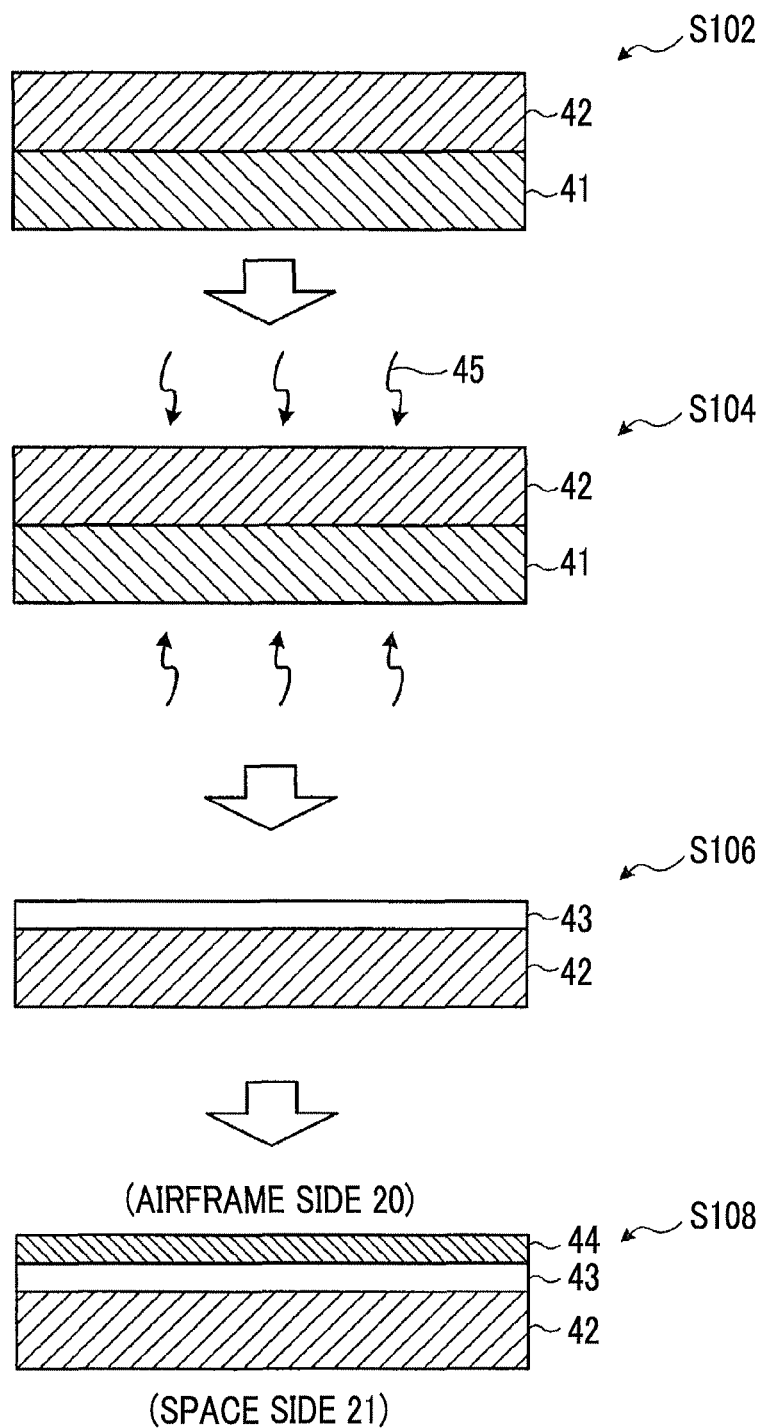
FIG. 14 is a schematic view showing an example of a first production method for a flexible thermal-control material.

FIG. 14 is a schematic view showing an example of a first production method for a flexible thermal-control material. Hereinafter, the production method for the flexible thermal-control material will be described with reference to FIG. 14.

In Step S102, a light-adhesion laminated body in which a FEP resin 42 is laminated on a polyimide resin sheet which is a support structure 41 is prepared. The light-adhesion means laminating at a degree of adhesion so as to peel the FEP resin 42 off from the support structure after radiation crosslinking. Such a light-adhesion laminated body can be obtained by heat sealing or plasma treatment.

In Step S104, the light-adhesion laminated body laminated in Step S102 is subjected to crosslinking under the following conditions using ionizing radioactive rays 45. The FEP resin 42 is peeled off from the support structure 41 after the crosslinking.

(Crosslinking Conditions)
Crosslinking temperature: from 260° C. to 280° C.
Ionizing radioactive ray: electron ray
Dose: several tens KGy to 200 KGy
Crosslinking atmosphere: inert gas atmosphere (argon or nitrogen)

In Step S106, a metal film which is a reflection layer 43 is formed on the surface of the FEP resin 42 which is peeled off from the support structure 41 after the crosslinking in Step S104. The metal film can be formed by accumulating high-reflectivity metal such as aluminum or silver by a vapor deposition method.

In Step S108, an antioxidant layer 44 is formed on the reflection layer 43 which is formed in Step S106. The antioxidant layer 44, for example, can be formed by a method of chemically or physically accumulating a nickel-base superalloy (inconel the like) thin film, or a method of adhering a nickel-base superalloy thin film on the reflection layer 43.

In the flexible thermal-control material formed by the example, the FEP resin 42 which is a radiation crosslinked fluorine resin becomes an infrared radiation layer and a layer on the space side 21, and the antioxidant layer 44 becomes the airframe side 20.

Example 10

Production Example 2 of Flexible Thermal-Control Material

Figure 15:
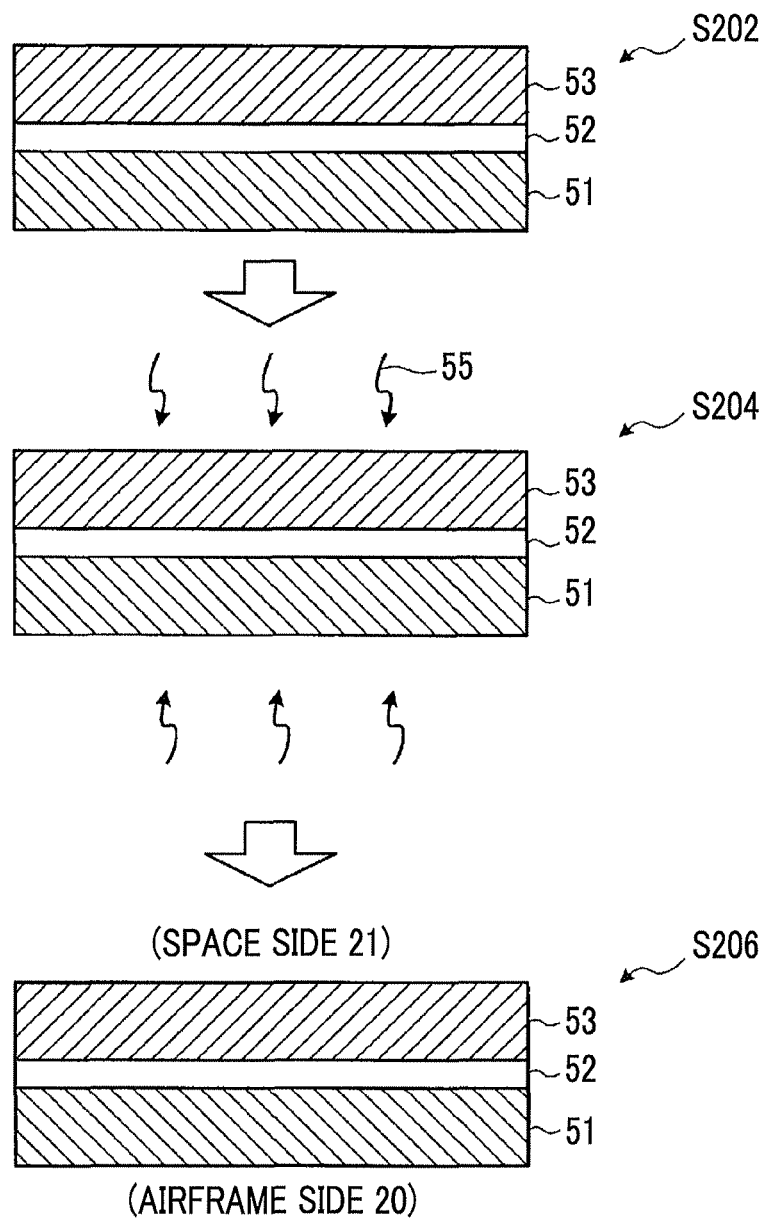
FIG. 15 is a schematic view showing an example of a second production method for a flexible thermal-control material.

FIG. 15 is a schematic view showing an example of a second production method for a flexible thermal-control material. Hereinafter, the production method for the flexible thermal-control material will be described with reference to FIG. 15. The description overlapping with that in Example 9 will be suitably omitted.

In Step S202, a metal film which is a reflection layer 52 is formed on an upper surface of a support layer 51 formed of a polyimide resin film. The metal film can be formed by accumulating high-reflectivity metal such as aluminum or silver by a vapor deposition method. In addition, a FEP resin 53 which is a fluorine resin which is not yet subjected to radiation crosslinking is laminated on the upper surface of the reflection layer 52 to form a laminated body. The FEP resin 53 can be laminated on the surface of the reflection layer 52 by heat sealing.

In Step S204, the laminated body formed in Step S202 is subjected to crosslinking under the following conditions using ionizing radioactive rays 55.

(Crosslinking Conditions)
Crosslinking temperature: from 260° C. to 280° C.
Ionizing radioactive ray: electron ray
Dose: several tens KGy to 200 KGy Crosslinking atmosphere: inert gas atmosphere (argon or nitrogen)

In Step S206, a flexible thermal-control material containing the radiation crosslinked FEP resin 53 as an infrared radiation layer is obtained. In the flexible thermal-control material formed by the example, the support layer 51 formed of a polyimide resin film becomes a layer on the airframe side 20, and the FEP resin 53 which is the radiation crosslinked fluorine resin becomes an infrared radiation layer and a layer on the space side 21.

REFERENCE SIGNS LIST 10 (10A to 10F) Flexible thermal-control material
12 Reflection layer
13 Infrared radiation layer
14 Antioxidant layer
15 Support layer
17 Conductive layer
18 Bonding layer
20 Airframe side (adherend side)
21 Space side
30 Propellant tank (adherend)
31 PIF heat insulating layer (surface of propellant tank)
41 Support structure
42 FEP resin
43 Reflection layer
44 Antioxidant layer
51 Support layer
52 Reflection layer
53 FP resin
61 Polyimide foam heat insulating layer

The invention claimed is:

1. A flexible thermal-control material which is formed by laminating:
   a reflection layer which reflects solar light; and
   an infrared radiation layer which radiates infrared light,
   wherein the infrared radiation layer comprises a radiation crosslinked fluorine resin material, wherein
   a support layer is further laminated on a surface of the reflection layer on the side opposite to the surface where the infrared radiation layer is laminated, and
   the support layer is formed with a polyimide material or a polyester material.

2. The flexible thermal-control material according to claim 1,
   wherein a protection layer is further laminated on a surface of the infrared radiation layer on the side opposite to the surface where the reflection layer is laminated, and the protection layer comprises a silsesquioxane.

3. The flexible thermal-control material according to claim 2,
   wherein a conductive layer is further laminated on the protection layer.

4. The flexible thermal-control material according to claim 1,
   wherein an antioxidant layer is further laminated on a surface of the reflection layer on the side opposite to the surface where the infrared radiation layer is laminated.

5. The flexible thermal-control material according to claim 4,
   wherein the antioxidant layer is provided between the reflection layer and the support layer.

6. The flexible thermal-control material according to claim 1, which is fixed to a surface of an adherend by a bonding layer.

7. The flexible thermal-control material according to claim 1, which is fixed to a surface of an adherend by a fastening member.

8. The flexible thermal-control material according to claim 6,
   wherein the adherend is a propellant tank of a rocket or an artificial satellite used in space.

9. The flexible thermal-control material according to claim 8,
   wherein the propellant tank is a liquid hydrogen tank.

10. The flexible thermal-control material according to claim 6,
    wherein a surface of the adherend is any one of a polyisocyanurate foam (PIF) heat insulating layer and a polyimide foam heat insulating layer or a heat insulating layer of a laminated body thereof.

11. The flexible thermal-control material according to claim 10,
    wherein the surface of the adherend includes a degassing groove in any one of a polyisocyanurate foam (PIF) heat insulating layer and a polyimide foam heat insulating layer or a heat insulating layer of a laminated body thereof.

* * * * *